E. J. ANDRIEU.
TUBE FOR AUTOMOBILES, BICYCLES, AND THE LIKE.
APPLICATION FILED FEB. 26, 1912.
1,056,726. Patented Mar. 18, 1913.
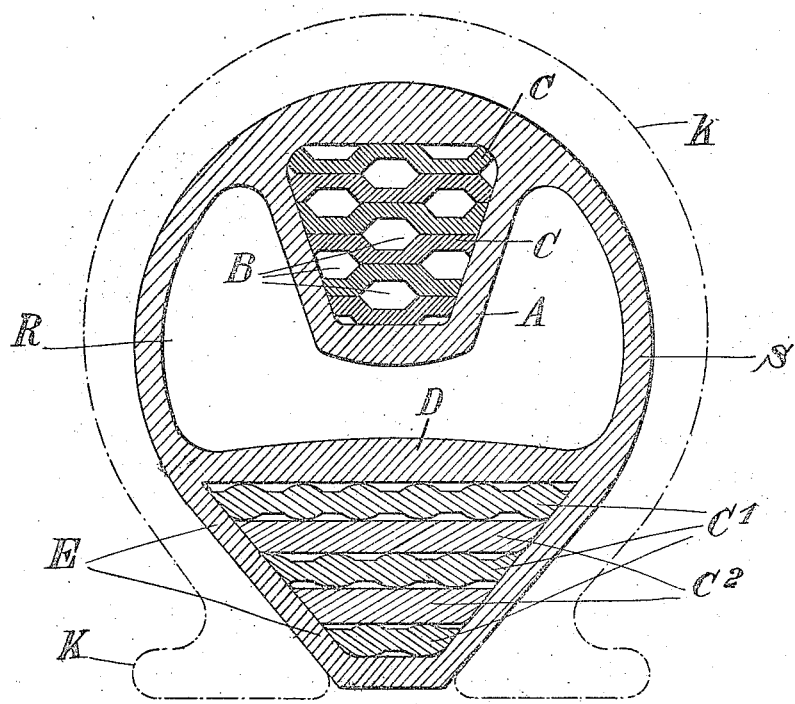
Witnesses:
Inventor:
Eugène Joseph Andrieu
Attorney

UNITED STATES PATENT OFFICE.

EUGÈNE JOSEPH ANDRIEU, OF ROUBAIX, FRANCE.

TUBE FOR AUTOMOBILES, BICYCLES, AND THE LIKE.

1,056,726.  Specification of Letters Patent.  Patented Mar. 18, 1913.

Application filed February 20, 1912. Serial No. 680,026.

*To all whom it may concern:*

Be it known that I, EUGÈNE JOSEPH ANDRIEU, a citizen of the French Republic, and resident of Roubaix, France, have invented certain new and useful Improvements in Tubes for Automobiles, Bicycles, and the Like, of which the following is a specification.

This invention relates to improvements in tires, and more particularly to the construction of inner tubes.

The object of the invention is to provide reinforcements at the inner and outer portion of the tube, the reinforcements being so constructed and arranged that the pneumatic features of the tube will not be seriously affected.

The invention also relates to the details of construction of parts which will be hereinafter described and particularly pointed out in the claims.

The view in the drawing represents a cross section of my improvement, the outer casing of the tire herein shown in dotted lines.

S indicates a tire tube the inner portion of which tapers as shown at E. An inwardly extended tapered partition A, projects from the inner surface of the tread portion of the tube, and extends entirely around the latter. The partition A forms a tapered pocket in which are layers of resilient strips of material C. Each strip is formed with alternate annular ribs and projections, so that when the strips are assembled in the pockets a plurality of annular air channels B, are formed.

Extending across the tube adjacent the tapered portion E is a substantially horizontal partition D, which with the walls of the tube form a pocket, in which strips of resilient material C' and C² are confined. The strips C' are formed on their opposite surfaces with alternating ribs and depressions. The surfaces of the strips C² are flat, so that when all the strips are assembled in the pocket a plurality of annular air channels are formed between the partition D and the inner tapered end of the tube.

In the manufacture of my improved tire, the tube is slightly vulcanized, sufficiently to make it hold its shape. The strips C, C¹, and C², are also lightly vulcanized in the same manner as the tube. The strips C¹ and C² are subjected to the action of a solvent to bind them together, and then with the strips C, are placed in the tube. The tube and strips are connected and then the tire is subjected to the final vulcanizing operation.

In operation, the tube is inserted in the casing K in the usual manner, as indicated in the drawing. If the tube should be punctured the air would of course escape from the chamber R, but because of the partitions the tire can be used. The load will compress the tire and the inner surface of the partition A, will contact with the partition D, and as the air channels in the pockets are closed, the effectiveness of the tire will not be destroyed.

Having now fully described my said invention, what I claim and desire to secure by Letters Patent, is:

1. A wheel tire comprising a continuous air tube, the inner portion of which is tapered in cross section, the tube having a partition formed therein adjacent the tapered portion to form an annular pocket, layers of resilient strips inserted in said pocket, certain of said resilient strips having ribs and depressions to form spaces between said strips, an annular hollow portion projecting from the inner surface of the outer portion of the tube to form a pocket, a plurality of resilient strips supported in the latter pocket, each of said strips having projections and depressions on opposite faces to provide annular air channels in said pocket.

2. A wheel tire comprising a continuous air tube, the inner portion of which is tapered, said tube having a partition formed therein adjacent the tapered portion to provide a pocket, resilient strips of material supported in the pocket, an abutment formed at the outer portion of said tube and projecting inwardly toward the partition, the said abutment containing an annular resilient strip formed with depressions and ribs to provide air channels.

3. A tire for a wheel comprising a continuous tube, the inner portion of which tapers in cross section, the inner portion of the tube having a plurality of annular air chambers, a tapered partition projecting from the inner surface of the tread portion of the tube and forming a tapered pocket, a plurality of layers of resilient material supported in the last mentioned tapered pocket, each of the latter layers of resilient material having alternating ribs and depressions on opposite sides, the said alternating ribs and depressions forming a plurality of air channels when the layers are assembled in the tapered pocket, the inner portion of the tube with the annular chambers serving as a buffer for the projection In testimony whereof I have hereunto set my hand in presence of two witnesses.

EUGÈNE JOSEPH ANDRIEU.

Witnesses:
CHARLES SIEVIN,
JULES ANDRIEU.